US006788825B1

(12) United States Patent
Fujino (10) Patent No.: US 6,788,825 B1
(45) Date of Patent: Sep. 7, 2004

(54) IMAGE PROCESSING APPARATUS (75) Inventor: Hironobu Fujino, Ikoma-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 09/616,267

(22) Filed: Jul. 14, 2000

(30) Foreign Application Priority Data

Jul. 14, 1999 (JP) .......................................... H11-200497

(51) Int. Cl.[7] .............................................. G06K 9/40
(52) U.S. Cl. ...................... 382/266; 382/199; 382/263
(58) Field of Search ................................. 382/100, 103, 382/107, 112, 135, 136, 173, 180, 190, 199, 233, 260, 266, 162, 163, 164, 168, 171, 276; 348/169, 172, 208.1, 214, 272, 699; 358/462, 265, 2.1, 2.99, 3.23, 530, 534, 443, 448

(56) References Cited

U.S. PATENT DOCUMENTS

| | | | | |
|---|---|---|---|---|
| 4,905,023 A | * | 2/1990 | Suzuki | 347/252 |
| 5,341,143 A | * | 8/1994 | Reis et al. | 342/64 |
| 5,586,063 A | * | 12/1996 | Hardin et al. | 702/42 |
| 5,760,921 A | * | 6/1998 | Miyake | 358/3.07 |
| 6,072,889 A | * | 6/2000 | Deaett et al. | 382/103 |
| 6,181,437 B1 | * | 1/2001 | Sawada | 358/1.9 |

FOREIGN PATENT DOCUMENTS

| | | |
|---|---|---|
| JP | 5-94515 | 4/1993 |
| JP | 9-91419 | 4/1997 |

* cited by examiner

*Primary Examiner*—Bhavesh M. Mehta
*Assistant Examiner*—Abolfazl Tabatabai
(74) *Attorney, Agent, or Firm*—Edwards & Angell, LLP; David G. Conlin; George W. Hartnell, III (57) ABSTRACT

In a vertical direction processor 3A, subtracters 14A, 15A, and 16A calculate differences between the image data of four vertically adjacent pixels, and, on the basis of the absolute values and signs of the thus calculated differences, the values of these differences are changed. By using the thus changed differences, the image data of the four pixels are produced. In addition, in a horizontal direction processor 3B, subtracters 14B, 15B, and 16B calculate differences between the image data of four horizontally adjacent pixels, and, on the basis of the absolute values and signs of the thus calculated differences, the values of these differences are changed. By using the thus changed differences, the image data of the four pixels are produced.

12 Claims, 8 Drawing Sheets

HORIZONTAL DIRECTION

HORIZONTAL DIRECTION

| | | | | | | |
|---|---|---|---|---|---|---|
| LINE MEMORY 11A | G36 | G35 | G34 | G33 | G32 | G31 |
| LINE MEMORY 12A | G26 | G25 | G24 | G23 | G22 | G21 |
| LINE MEMORY 13A | G16 | G15 | G14 | G13 | G12 | G11 |

FIG.9B

| | | | | | | | | |
|---|---|---|---|---|---|---|---|---|
| LINE MEMORY 11A | G41 | G36 | G35 | G34 | G33 | G32 | DELAY 11B | G11 |
| LINE MEMORY 12A | G31 | G26 | G25 | G24 | G23 | G22 | | |
| LINE MEMORY 13A | G21 | G16 | G15 | G14 | G13 | G12 | | |

FIG.9C

| | | | | | | | | |
|---|---|---|---|---|---|---|---|---|
| LINE MEMORY 11A | G43 | G42 | G41 | G36 | G35 | G34 | DELAY 11B | G13 |
| LINE MEMORY 12A | G33 | G32 | G31 | G26 | G25 | G24 | DELAY 12B | G12 |
| LINE MEMORY 13A | G23 | G22 | G21 | G16 | G15 | G14 | DELAY 13B | G11 |

FIG.9D

| | | | | | | | | |
|---|---|---|---|---|---|---|---|---|
| LINE MEMORY 11A | G44 | G43 | G42 | G41 | G36 | G35 | DELAY 11B | G14 |
| LINE MEMORY 12A | G34 | G33 | G32 | G31 | G26 | G25 | DELAY 12B | G13 |
| LINE MEMORY 13A | G24 | G23 | G22 | G21 | G16 | G15 | DELAY 13B | G12 |

FIG.9E

| | | | | | | | | |
|---|---|---|---|---|---|---|---|---|
| LINE MEMORY 11A | G46 | G45 | G44 | G43 | G42 | G41 | DELAY 11B | G16 |
| LINE MEMORY 12A | G36 | G35 | G34 | G33 | G32 | G31 | DELAY 12B | G15 |
| LINE MEMORY 13A | G26 | G25 | G24 | G23 | G22 | G21 | DELAY 13B | G14 |

FIG.9F

| | | | | | | | | |
|---|---|---|---|---|---|---|---|---|
| LINE MEMORY 11A | G53 | G52 | G51 | G46 | G45 | G44 | DELAY 11B | G23 |
| LINE MEMORY 12A | G43 | G42 | G41 | G36 | G35 | G34 | DELAY 12B | G22 |
| LINE MEMORY 13A | G33 | G32 | G31 | G26 | G25 | G24 | DELAY 13B | G21 |

FIG.10

IMAGE PROCESSING APPARATUS

BACKGROUND OF THE INVENTION

1. Field of the Invention

The present invention relates to an image processing apparatus that performs edge enhancement to obtain high-resolution images.

2. Description of the Prior Art

Conventionally, when an image for interlaced scanning or an image whose resolution have been converted is reproduced, the image data of pixels close to pixels having no image data are spatially or temporally interpolated to produce image data so that the thus produced image data are given to the pixels having no image data. At this time, the pixels having no image data are given image data having values close to the image data of the pixels spatially adjacent thereto, and therefore the reproduced image appears blurred, with unclear edges. One known way to avoid this is to use a Laplacian process that achieves edge enhancement of an image by adding to the image data of individual pixels their Laplacian values, i.e. their second spatial derivatives.

However, enhancing edges in an image simply by adding Laplacian values ends in enhancing noise components also, and thus tends to degrade the graininess of the processed image. To solve this problem, Japanese Patent Applications Laid-Open Nos. H5-94515 and H9-91419 propose image processing apparatuses that perform edge enhancement with minimal effects of noise components.

According to the Japanese Patent Application Laid-Open No. H5-94515 mentioned above, black-peak calculation is performed whereby a Laplacian value and a black peak are compared to select whichever is smaller, and also white-peak calculation is performed whereby a Laplacian value and a white peak are compared to select whichever is greater. By performing black-peak and white-peak calculation in this way, it is possible to eliminate Laplacian values having small amplitude components, i.e. those resulting from noise components. However, using threshold values like black and white peaks in this way causes edges having values smaller than those threshold values to be excluded from edge enhancement, and thus no edge enhancement is performed for edges having small intensity-gradients, causing them appear blurred.

On the other hand, according to the Japanese Patent Application Laid-Open No. H9-91419 mentioned above, for all pixels of an image, edge data are detected and their frequency of occurrence is evaluated so that thereafter, in accordance with the evaluated frequency of occurrence, the Laplacian values of the individual pixels are given different weights. By performing the Laplacian process with appropriate weights given to Laplacian values in this way, it is possible to prevent the degradation in graininess of the processed image. However, to select appropriate weights, it is necessary to detect edge data and evaluate their frequency of occurrence for all pixels first, which requires much time. Moreover, it is also necessary to determine weights corresponding to different edge data beforehand by experiments or the like, and therefore, when an image having a different pattern from that of the image used in the experiments is processed, there is a risk of unwanted unevenness appearing in the processed image.

SUMMARY OF THE INVENTION

An object of the present invention is to provide an image processing apparatus that performs edge enhancement with minimal effects of noise components.

Another object of the present invention is to provide an image processing apparatus that performs edge enhancement in accordance with the intensity gradients of pixels so as to offer images with satisfactory gradation.

To achieve the above objects, according to the present invention, an image processing apparatus is provided with: a difference calculator that calculates, for each detection-target unit including a predetermined number of pixels, the differences between the values of every two adjacent pixels within the detection-target unit; and a pixel value determiner that changes the values of two pixels located at the center of the detection-target unit in such a way as to increase the difference between the values of those two pixels when the difference between the values of those two pixels has the greatest absolute value within the detection-target unit and all the differences between the values of every two adjacent pixels within the detection-target unit have identical signs.

This image processing apparatus may be so configured that the pixel value determiner changes the values of the two pixels located at the center of the detection-target unit in such a way as to increase the difference between the values of those two pixels when the difference between the values of those two pixels has the greatest absolute value within the detection-target unit, and the difference between the absolute value of the difference between the values of the two pixels located at the center and the absolute values of the differences between the values of the other pixels is greater than a threshold value having a predetermined value, and in addition all the differences between the values of every two adjacent pixels within the detection-target unit have identical signs. This makes it possible to produce high-resolution images with minimal effects of noise components.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
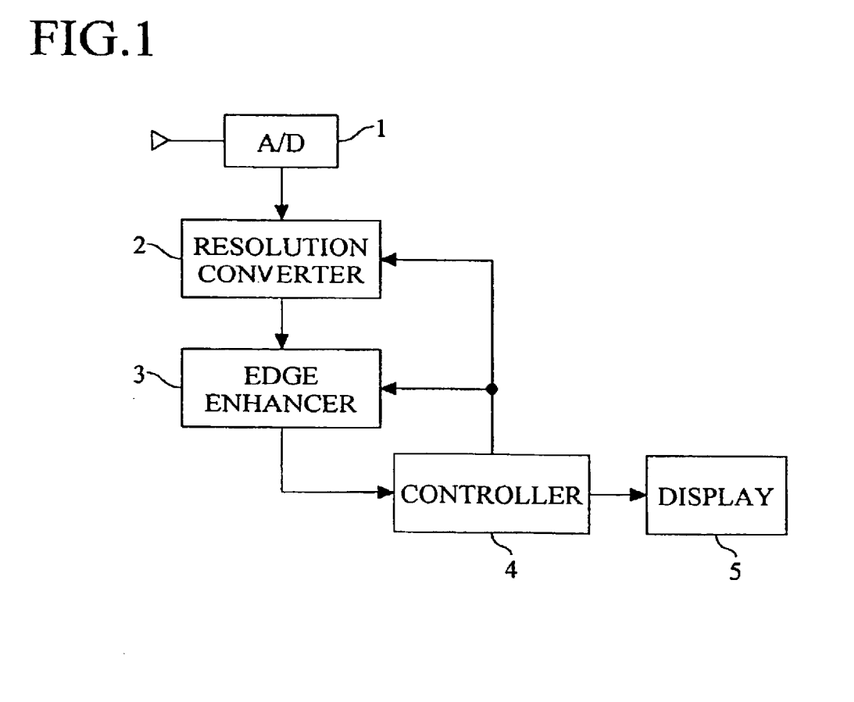
FIG. 1 is a block diagram showing the internal configuration of an image processing apparatus embodying the invention.

A first embodiment of the present invention will be described with reference to the drawings. FIG. 1 is a block diagram showing the internal configuration of the image processing apparatus of this embodiment. The image processing apparatus shown in FIG. 1 is composed of the following constituent blocks. An A/D converter 1 coverts image data fed thereto in the form of an analog signal conveying the brightness information of individual pixels into a digital signal. A resolution converter 2 interpolates the image data in accordance with the resolution specified through key operation or the like by the user. An edge enhancer 3 performs edge enhancement on the image data output from the resolution converter 2. A controller 4 reproduces an image by feeding signals to the individual pixels of a display 5 in accordance with the image data output from the edge enhancer 3, and also controls the resolution converter 2 and the edge enhancer 3. The display 5 displays the reproduced image.

To this image processing apparatus are fed, for example, image data read out from the individual pixels of an area sensor or line sensor, or image data stored on a recording medium, or image data output from a personal computer or the like. The image data of individual pixels thus fed in are converted into, for example, an eight-bit digital signal by the A/D converter 1, and is then fed to the resolution converter 2. The resolution converter 2 recognizes the resolution that the user specifies by operating a switch (not shown) or the like that is provided in the image processing apparatus so as to permit enlargement and reduction of images, and, on the basis of the image data output from the A/D converter 1, produces image data having the number of pixels that conforms to the specified resolution.

In this resolution converter 2, image data having the number of pixels that conforms to the specified resolution are produced, for example, by enlargement/reduction using multiple-tap digital filters, or by wavelet conversion. The image data thus converted by the resolution converter 2 are then fed to the edge enhancer 3. Now, the operation of the edge enhancer 3 will be described with reference to the flow charts shown in FIGS. 2 and 3. FIGS. 5A, 5B, 5C, 6A, and 6B illustrate how the image data of individual pixels change as the edge enhancer 3 operates as shown in those flow charts. In FIGS. 5A, 5B, 5C, 6A, and 6B, the values noted in the pixels a, b, c, and d represent the image data (values) of those pixels.

Figure 2:
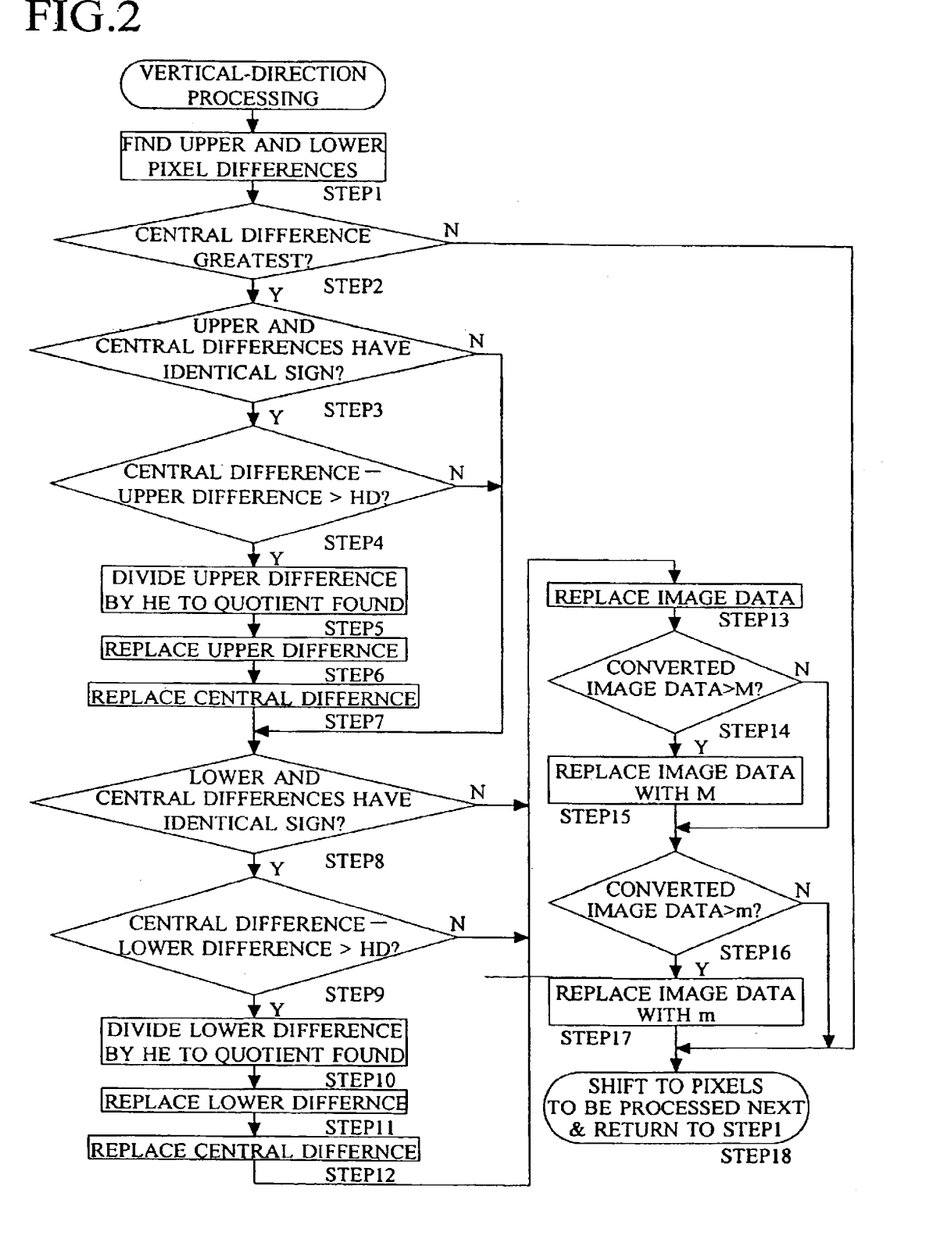
FIG. 2 is a flow chart showing the edge enhancement process using pixels located along a vertical line performed in a first embodiment of the invention.
Figure 4:
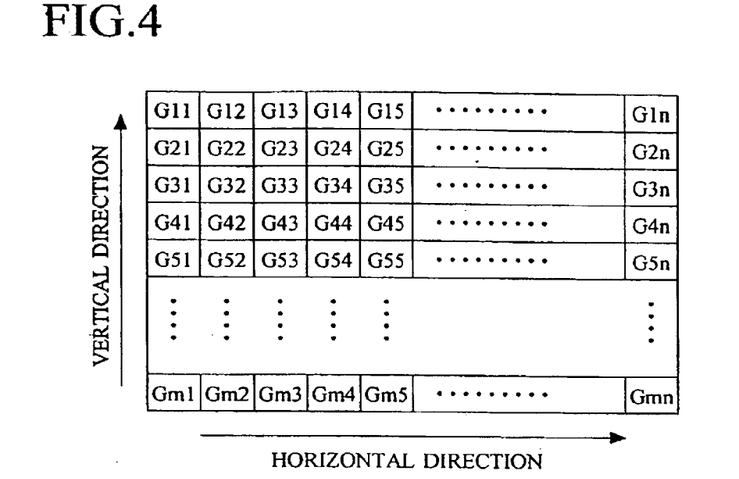
FIG. 4 is a diagram showing the arrangement of pixels.
Figure 5A:
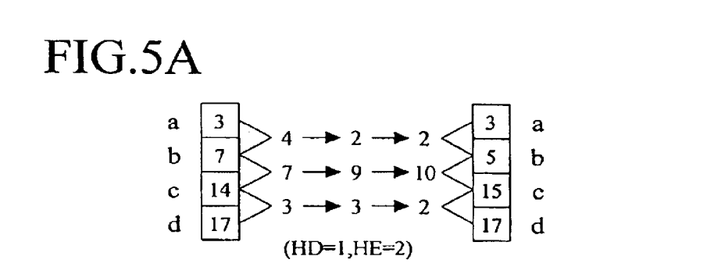
FIGS. 5A, 5B, and 5C are diagrams showing the image data of pixels before and after the edge enhancement process to illustrate how the image data are changed by the process.

First, the operations shown in the flow chart of FIG. 2 are performed so that the image data to be given to individual pixels G11 to Gmn arranged as shown in FIG. 4 are processed in the vertical direction. First, the image data of the four vertically adjacent pixels G11, G21, G31, and G41 are read out and processed as follows. Here, assume that the pixels G11, G21, G31, and G41 in FIG. 4 correspond to the pixels a, b, c, and d in FIGS. 5A, 5B, and 5C. With these pixels a, b, c, and d, first the difference of the image data of the pixel a from the image data of the pixel b (hereafter referred to as the "upper difference"), the difference of the image data of the pixel b from the image data of the pixel c (hereafter referred to as the "central difference"), and the difference of the image data of the pixel c from the image data of the pixel d (hereafter referred to as the "lower difference") are calculated (STEP 1). Suppose, for example, that, as shown in FIG. 5A, the image data of the pixels a, b, c, and d are "3", "7", "14", and "17", respectively. Then, the upper, central, and lower differences are "4", "7", and "3", respectively.

After the differences between every two adjacent pixels have been calculated in this way, the absolute values of the upper, central, and lower differences are compared with one another, and whether the central difference has the greatest absolute value or not is checked (STEP 2). Here, if the central difference is found to have the greatest absolute value, the operation flow proceeds to the next STEP 3, where whether the upper and central differences have identical signs or not is checked. Here, if these two differences are found to have identical signs, the operation flow proceeds to the next STEP 4, where whether the difference between the upper and central differences is greater than a threshold value HD or not is checked. Here, if this difference is found to be greater than the threshold value HD, the operation flow proceeds to the next STEP 5.

Now, the upper, central, and lower differences are "4", "7", and "3", respectively. Accordingly, when their absolute values are compared, the central difference is found to have the greatest absolute value, and thus the operation flow proceeds to STEP 3. In STEP 3, the upper and central differences are found to have identical signs, and thus the operation flow proceeds to STEP 4. In STEP 4, if the threshold value HD is assumed to be "1", the difference between the upper and central differences is "3" and is therefore found to be greater than the threshold value HD, and thus the operation flow proceeds to STEP 5.

In STEP 5, this difference is divided by a threshold value HE, and the resulting quotient is rounded down to the nearest integer number. Then, the upper difference is replaced with the value obtained by subtracting therefrom the value of the integer-number portion of this quotient (STEP 6). Moreover, the central difference is replaced with the value obtained by adding thereto the value of the integer-number portion of the quotient calculated in STEP 5 (STEP 7). Now, if the threshold value HE is assumed to be "2" in STEP 5, dividing the upper difference "4" by this threshold value HE "2" yields a quotient having an integer-number portion "2". Thus, in STEP 6 and STEP 7, using the integer-number portion "2" of this quotient, the upper difference "4" is replaced with "4-2", i.e. "2", and the central difference "7" is replaced with "7+2", i.e. "9".

After STEP 7 is executed in this way, the operation flow proceeds to STEP 8. On the other hand, also when the upper and central differences are found not to have identical signs in STEP 3, or when the difference between the upper and central differences is found to be smaller than the threshold value HD in STEP 4, the operation flow proceeds to STEP 8. In STEP 8 to STEP 12, the same operations as in STEP 3 to STEP 7 are performed for the lower and central differences.

Specifically, first, whether the lower and central differences have identical signs or not is checked (STEP 8), and then the difference between the lower and central differences is greater than the threshold value HD or not is checked (STEP 9). Then, if the lower and central differences are found to have identical signs and their difference is found to be greater than the threshold value HD, the lower difference is divided by the threshold value HE and the resulting quotient is rounded down to the nearest integer number (STEP 10). Thereafter, the lower difference is replaced with the value obtained by subtracting therefrom the integer-number portion of the quotient calculated this time (STEP 11), and the central difference, either as originally read out or as replaced in STEP 8, is replaced with the value obtained by adding thereto the integer-number portion of the quotient calculated this time (STEP 12).

Now, the central and lower differences are "7" and "3", respectively. Accordingly, in STEP 8, the lower and central differences are found to have identical signs, and thus the operation flow proceeds to STEP 9. In STEP 9, since the threshold value HD is "1", the difference between the lower and central differences is "4" and is therefore found to be greater than the threshold value HD, and thus the operation flow proceeds to STEP 10. Then, in STEP 10, since the threshold value HE is "2", dividing the lower difference "3" by this threshold value HE "2" yields a quotient having an integer-number portion "1". Thus, in STEP 11 and STEP 12, using the integer-number portion "1" of this quotient, the lower difference "3" is replaced with "3−1", i.e. "2", and the central difference "9" is replaced with "9+1", i.e. "10".

After the operations in the steps leading to and including STEP 12 have been performed, using the image data of the pixel a and the upper, central, and lower differences, the image data of the pixels b, c, and d are converted (STEP 13). On the other hand, also when the lower and central differences are found not to have identical signs in STEP 8, or when the difference between the lower and central differences is found to be smaller than the threshold value HD in STEP 9, the operation flow proceeds to STEP 13 to perform the same operation as described just above. Now, the image data of the pixel a and the upper, central, and lower differences are "3", "2", "10", and "2", respectively, and accordingly the image data of the pixels b, c, and d are replaced with "5", "15", and "17", respectively.

Then, whether the image data of the thus converted pixels b, c, and d are greater than the maximum value M (for example, with eight-bit image data, the maximum value M is "255") or not is checked (STEP 14). The image data of whichever pixel has image data greater than the maximum value M are replaced with the maximum value M (STEP 15). If, in STEP 14, no pixels are found to have image data greater than the maximum value M, the operation flow proceeds to STEP 16.

Lastly, whether the image data of the thus converted pixels b, c, and d are smaller than the minimum value m (for example, with eight-bit image data, the maximum value m is "0") or not is checked (STEP 16). The image data of whichever pixel has image data smaller than the minimum value m are replaced with the minimum value m (STEP 17).

After the pixels a, b, c, and d, i.e. the pixels G11, G21, G31, and G41 (FIG. 4), have been processed in this way, then, to perform the operations in STEP 1 to STEP 17 on the pixels shifted one pixel vertically, i.e. the pixels G21, G31, G41, and G51, the target pixels are shifted one pixel vertically, and the operation flow returns to STEP 1 (STEP 18). On the other hand, while the pixels G11, G21, G31, and G41 are being processed, if the central difference is found not to have the greatest absolute value in STEP 2, or if no pixels are found to have image data smaller than the minimum value m in STEP 16, then the operation flow proceeds to STEP 18 to shift the target pixels to the pixels G21, G31, G41, and G51, and then returns to STEP 1.

In this way, the operations in STEP 1 to STEP 18 are repeated until the image data of the pixels G(m−3)1, G(m−2)1, G(m−1)1, and Gm1 have been processed. Subsequently, the operations in STEP 1 to STEP 18 are performed on the image data of the pixels G12, G22, G32, and G42. In this way, all the pixels arranged as shown in FIG. 4 go through the operations shown in the flow chart of FIG. 2, one column after another and four vertically adjacent pixels at a time, and thereby edge enhancement in the horizontal direction is achieved.

Figure 5B:
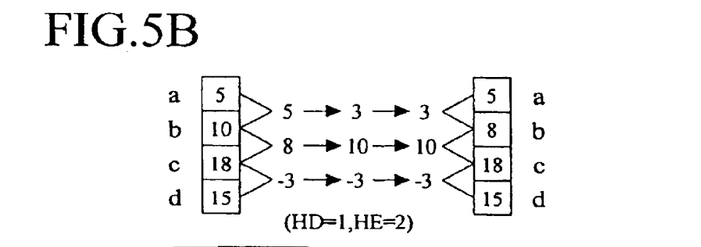

While the operations shown in the flow chart of FIG. 2 are being performed, if, as shown in FIG. 5B, the image data of four adjacent pixels a, b, c, and d are "5", "10", "18", and "15", then the upper, central, and lower differences are "5", "8", and "−3". In this case, the central difference has the greatest absolute value, and therefore the operations in STEP 3 to STEP 17 are performed. If the threshold values HD and HE are assumed to be "1" and "2", respectively, the upper and central differences have identical signs and their difference is greater than "1", and therefore the operations in STEP 5 to STEP 7 are performed. Thus, the upper and central differences are replaced with "3" and "10", respectively.

On the other hand, the lower and central differences have opposite signs, and therefore the replacement operations in STEP 10 to STEP 12 are not performed. Thus, the central and lower differences remain "10" and "−3", respectively. In this way, ultimately, the upper, central, and lower differences are "3", "10", and "−3", and accordingly the image data of the pixels a, b, c, and d after processing are "5", "8", "18", and "15", respectively.

Figure 5C:
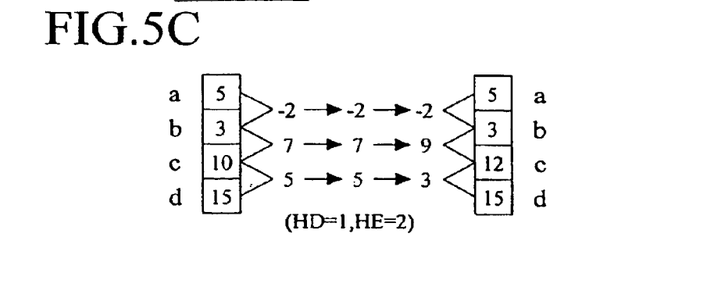

While the operations shown in the flow chart of FIG. 2 are being performed, if, as shown in FIG. 5C, the image data of four adjacent pixels a, b, c, and d are "5", "3", "10", and "15", then the upper, central, and lower differences are "−2", "7", and "5". In this case, the central difference has the greatest absolute value, and therefore the operations in STEP 3 to STEP 17 are performed. If the threshold values HD and HE are assumed to be "1" and "2", respectively, the upper and central differences have opposite signs, and therefore the replacement operations in STEP 5 and STEP 7 are not performed. Thus, the upper and central differences remain "−2" and "7", respectively.

On the other hand, the lower and central differences have identical signs and their difference is greater than "1", and therefore the operations in STEP 10 to STEP 12 are performed. Thus, the central and lower differences are replaced with "9" and "3", respectively. In this way, ultimately, the upper, central, and lower differences are "−2", "9", and "3", and accordingly the image data of the pixels a, b, c, and d after processing are "5", "3", "12", and "15", respectively.

Figures 6A, 6B:
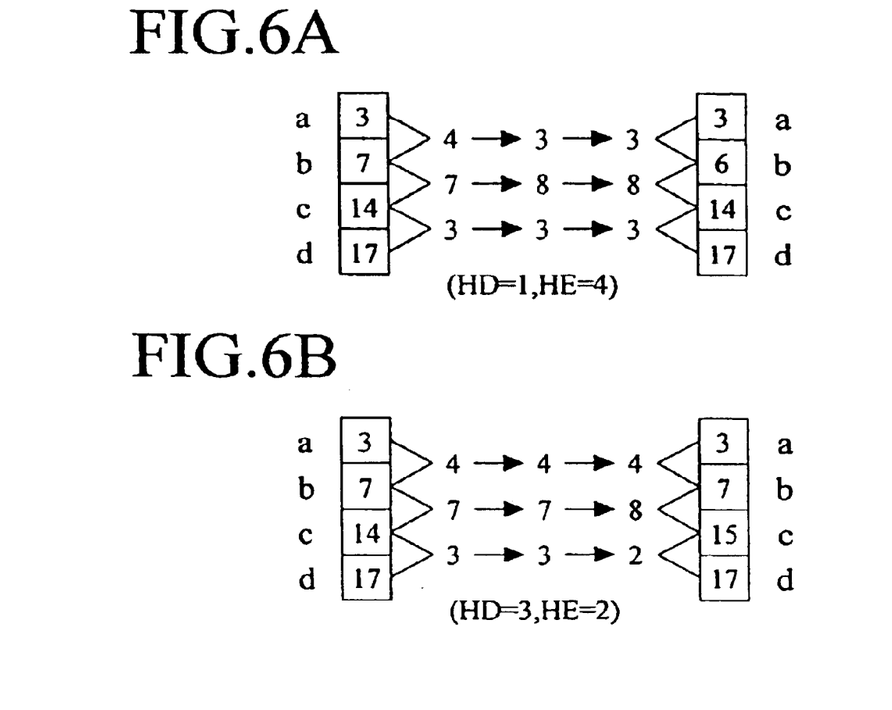
FIGS. 6A and 6B are diagrams showing the image data of pixels before and after the edge enhancement process to illustrate how the image data are changed by the process.

FIGS. 6A and 6B illustrate how the image data of pixels a, b, c, and d change when the threshold values HD and HE have different values. Here, how four pixels a, b, c, and d having image data "3", "7", "14", and "17", respectively, as shown in FIG. 5A are processed will be described. If, as shown in FIG. 6A, the threshold values HD and HE are assumed to be "1" and "4", respectively, the difference between the upper and central differences and the difference between the lower and central differences are both greater than the threshold value HD "1", and therefore the operations in STEP 5 to STEP 8 and the operations in STEP 10 to STEP 12 are performed.

In this case, dividing the upper difference by the threshold value HE "4" yields a quotient having an integer-number portion "1" in STEP 5, and dividing the lower difference by the threshold value HE "4" yields a quotient having an integer-number portion "0" in STEP 10. Thus, ultimately, the upper, central, and lower differences are "3", "8", and "3", respectively, and accordingly the image data of the pixels a, b, c, and d are "3", "6", "14", and "17".

If, as shown in FIG. 6B, the threshold values HD and HE are assumed to be "3" and "2", respectively, the difference between the upper and central differences is smaller than the threshold value HD "3", and therefore the operations in STEP 5 to STEP 8 are not performed. On the other hand, the difference between the lower and central differences is greater than the threshold value HD "3", and therefore the operations in STEP 10 to STEP 12 are performed. In this case, dividing the lower difference by the threshold value HE "2" yields a quotient having an integer-number portion "1" in STEP 10. Thus, ultimately, the upper, central, and lower differences are "4", "8", and "2", respectively, and accordingly the image data of the pixels a, b, c, and d are "3", "7", "15", and "17".

Figure 3:
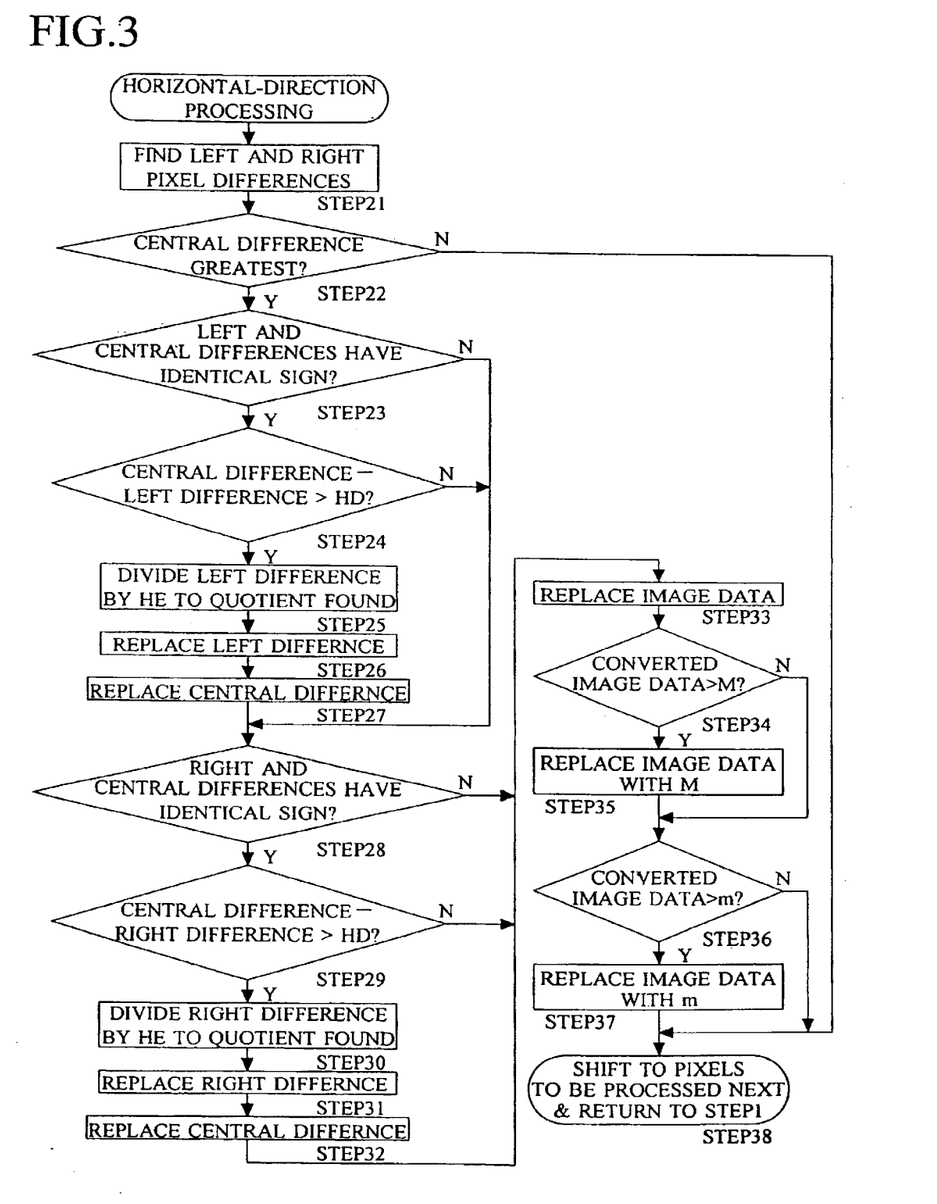
FIG. 3 is a flow chart showing the edge enhancement process using pixels located along a horizontal line performed in the first embodiment.

Furthermore, after the operations shown in the flow chart of FIG. 2 have been performed, the operations shown in the flow chart of FIG. 3 are performed on every four horizontally adjacent pixels. The operations shown in the flow chart of FIG. 3 that are performed on four horizontally adjacent pixels are quite similar to the operations shown in the flow chart of FIG. 2 that are performed on four vertically adjacent pixels. Specifically, for four horizontally adjacent pixels, referred to as pixels e, f, g, and h from the left, first, in STEP 21, the difference of the image data of the pixel e from the image data of the pixel f (hereafter referred to as the "left difference"), the difference of the image data of the pixel f from the image data of the pixel g (hereafter referred to as the "central difference"), and the difference of the image data of the pixel g from the image data of the pixel h (hereafter referred to as the "right difference") are calculated.

Then, in STEP 22, whether the central difference has the greatest absolute value or not is checked, and, if the central difference is found to have the greatest absolute value, the operations in STEP 23 and the following steps are performed. In STEP 23 to STEP 27, operations similar to those performed in STEP 3 to STEP 7 are performed on the left and central differences. Then, in STEP 28 to STEP 32, operations similar to those performed in STEP 8 to STEP 12 are performed on the right and central differences.

After the operations in STEP 23 to STEP 32 have been performed in this way, then, in STEP 33 to STEP 37, operations similar to those performed in STEP 13 to STEP 17 are performed on the image data of the pixels e, f, g, and h to replace the image data of the pixels e, f, g, and h. After the operations in the steps leading to and including STEP 37 have been performed, then, in STEP 38, the four target pixels are shifted one pixel horizontally, and the operations described above are repeated starting in STEP 21.

After the operations in STEP 21 to STEP 37 have been performed on the pixels G11, G12, G13, and G14 (FIG. 4) in this way, the operation flow proceeds to STEP 38 to shift the target pixels one pixel horizontally to G12, G13, G14, and G15, and then the operations in STEP 21 to STEP 37 are performed on those pixels. The operations in STEP 21 to STEP 38 are repeated until the image data of the pixels G1(n−3), G1(n−2), G1(n−1), and G1n have been processed. Subsequently, the operations in STEP 21 to STEP 38 are performed on the image data of the pixels G21, G22, G23, and G24. In this way, all the pixels arranged as shown in FIG. 4 go through the operations shown in the flow chart of FIG. 3, one row after another and four horizontally adjacent pixels at a time, and thereby edge enhancement in the vertical direction is achieved.

The image data thus subjected to edge enhancement in the horizontal and vertical directions in this way in the edge enhancer 3 are then fed to the controller 4. On the basis of these image data, the controller 4 feeds signals to the individual pixels of the display 5 and thereby displays an image on the display 5.

Second Embodiment

A second embodiment of the present invention will be described with reference to the drawings. The image processing apparatus of this embodiment has the same overall configuration as that of the first embodiment shown in FIG. 1, and differs therefrom only in the operation of the edge enhancer 3. Accordingly, only the internal configuration and operation of the edge enhancer 3 will be described below.

Figure 7:
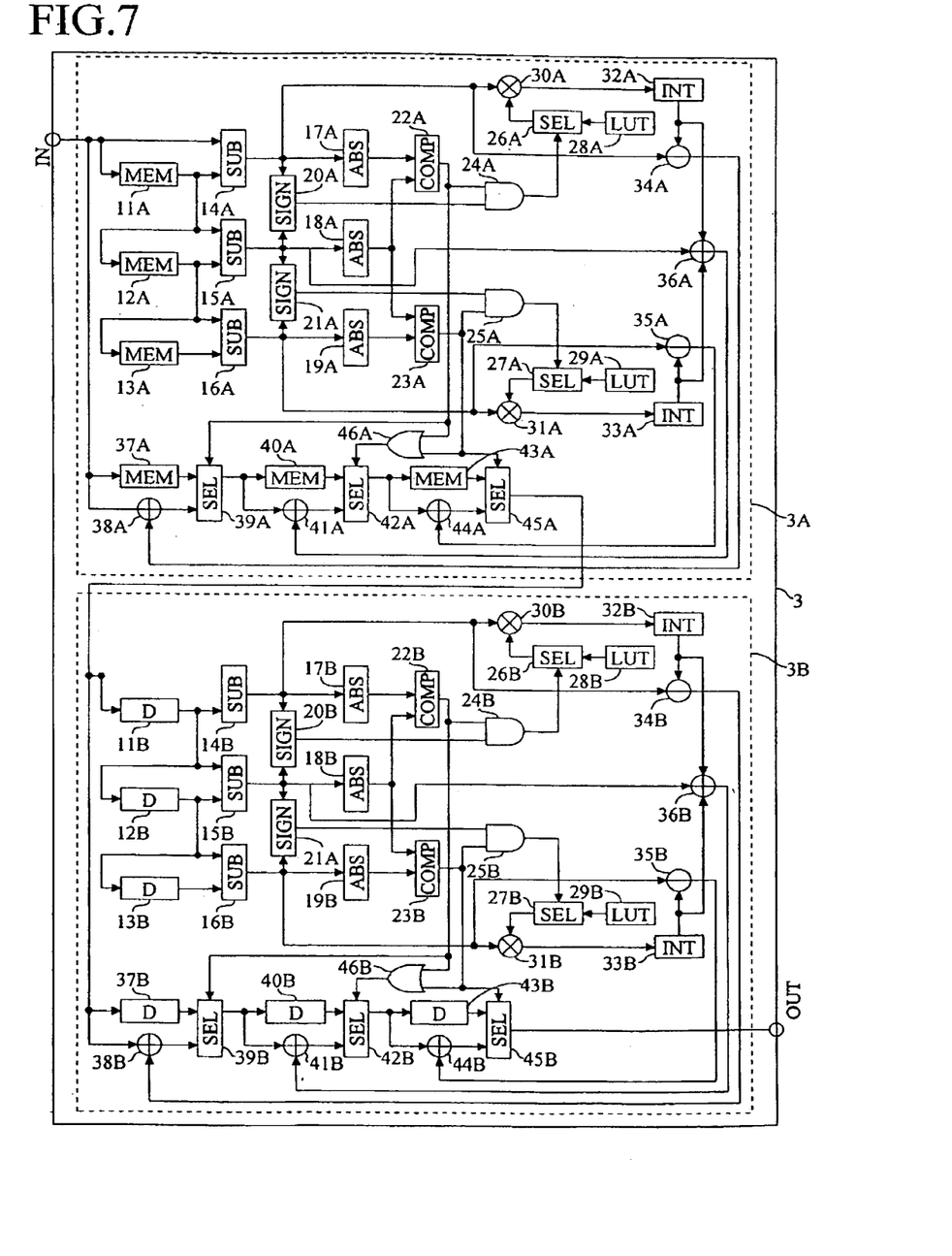
FIG. 7 is a block diagram showing the internal configuration of the edge enhancer shown in FIG. 1.

FIG. 7 shows the internal configuration of the edge enhancer 3. The edge enhancer 3 shown in FIG. 7 is composed of a vertical direction processor 3A and a horizontal direction processor 3B. The vertical direction processor 3A includes the following blocks. An input terminal IN is where the vertical direction processor receives the image data output from the resolution converter 2. Line memories 11A, 12A, and 13A each store the image data of pixels arranged in a line. Difference calculating circuits 14A, 15A, and 16A calculate the difference between the image data of vertically adjacent pixels. Absolute value calculating circuits 17A, 18A, and 19A calculate the absolute values of the outputs of the difference calculating circuits 14A, 15A, and 16A. Sign comparing circuits 20A and 21A respectively compare the signs of the outputs of the difference calculating circuits 14A and 15A and the signs of the outputs of the difference calculating circuits 15A and 16A. Comparing circuits 22A and 23A respectively compare the outputs of the absolute value calculating circuits 17A and 18A and the outputs of the absolute value calculating circuits 18A and 19A.

The vertical direction processor 3A further includes the following blocks. AND circuits 24A and 25A respectively receive the outputs of the sign comparing circuit 20A and the comparing circuit 22A and the outputs of the sign comparing circuit 21A and the comparing circuit 23A. Selector circuits 26A and 27A are respectively controlled by the outputs of the AND circuits 24A and 25A. Look-up tables 28A and 29A each store a predetermined set of data. Multiplying circuits 30A and 31A respectively multiply the outputs of the difference calculating circuits 14A and 16A by the outputs of the selector circuits 26A and 27A. Rounding-down circuits 32A and 33A round down the outputs of the multiplying circuits 30A and 31A to the nearest integer numbers. Subtracting circuits 34A and 35A subtract the outputs of the rounding-down circuits 32A and 33A from the outputs of the difference calculating circuits 14A and 16A. An adding circuit 36A adds the outputs of the rounding-down circuits 32A and 33A to the output of the difference calculating circuit 15A.

The vertical direction processor 3A further includes the following blocks. Line memories 37A, 40A, and 43A each store the image data of pixels arranged in a line. An OR circuit 46A receives the outputs of the comparing circuits 22A and 23A. An adding circuit 38A adds the output of the subtracting circuit 34A to the image data fed in via the input terminal IN. A selector circuit 39A receives a signal from the comparing circuit 22A and chooses between the output of the line memory 37A and the output of the adding circuit 38A. An adding circuit 41A adds the output of the adding circuit 36A to the output of the selector circuit 39A. A selector circuit 42A receives a signal from the OR circuit 46A and chooses between the output of the line memory 40A and the output of the adding circuit 41A. An adding circuit 44A adds the output of the subtracting circuit 35A to the output of the selector circuit 42A. A selector circuit 45A receives a signal from the comparing circuit 23A and chooses between the output of the line memory 43A and the output of the adding circuit 44A.

The horizontal direction processor 3B includes the following blocks. Delay circuits 11B, 12B, and 13B each store the image data of a pixel. Difference calculating circuits 14B, 15B, and 16B calculate the difference between the image data of horizontally adjacent pixels. Absolute value calculating circuits 17B, 18B, and 19B calculate the absolute values of the outputs of the difference calculating circuits 14B, 15B, and 16B. Sign comparing circuits 20B and 21B respectively compare the signs of the outputs of the difference calculating circuits 14B and 15B and the signs of the outputs of the difference calculating circuits 15B and 16B. Comparing circuits 22B and 23B respectively compare the outputs of the absolute value calculating circuits 17B and 18B and the outputs of the absolute value calculating circuits 18B and 19B.

The horizontal direction processor 3B further includes the following blocks. AND circuits 24B and 25B respectively receive the outputs of the sign comparing circuit 20B and the comparing circuit 22B and the outputs of the sign comparing circuit 21B and the comparing circuit 23B. Selector circuits 26B and 27B are respectively controlled by the outputs of the AND circuits 24B and 25B. Look-up tables 28B and 29B each store a predetermined set of data. Multiplying circuits 30B and 31B respectively multiply the outputs of the difference calculating circuits 14B and 16B by the outputs of the selector circuits 26B and 27B. Rounding-down circuits 32B and 33B round down the outputs of the multiplying circuits 30B and 31B to the nearest integer numbers. Subtracting circuits 34B and 35B subtract the outputs of the rounding-down circuits 32B and 33B from the outputs of the difference calculating circuits 14B and 16B. An adding circuit 36B adds the outputs of the rounding-down circuits 32B and 33B to the output of the difference calculating circuit 15B.

The horizontal direction processor 3B further includes the following blocks. Delay circuits 37B, 40B, and 43B each store the image data of a pixel. An OR circuit 46B receives the outputs of the comparing circuits 22B and 23B. An adding circuit 38B adds the output of the subtracting circuit 34B to the image data output from the selector circuit 45A. A selector circuit 39B receives a signal from the comparing circuit 22B and chooses between the output of the delay circuit 37B and the output of the adding circuit 38B. An adding circuit 41B adds the output of the adding circuit 36B to the output of the selector circuit 39B. A selector circuit 42B receives a signal from the OR circuit 46B and chooses between the output of the delay circuit 40B and the output of the adding circuit 41B. An adding circuit 44B adds the output of the subtracting circuit 35B to the output of the selector circuit 42B. A selector circuit 45B receives a signal from the comparing circuit 23B and chooses between the output of the delay circuit 43B and the output of the adding circuit 44B.

In the following descriptions, a difference calculating circuit will be referred to simply as a "SUB", an absolute value calculating circuit as an "ABS", a comparing circuit as a "COMP", a selector circuit as a "SEL", a look-up table as a "LUT", a rounding-down circuit as an "INT", an AND circuit as an "AND", an OR circuit as an "OR", and a delay circuit as a "DELAY".

Figure 8:
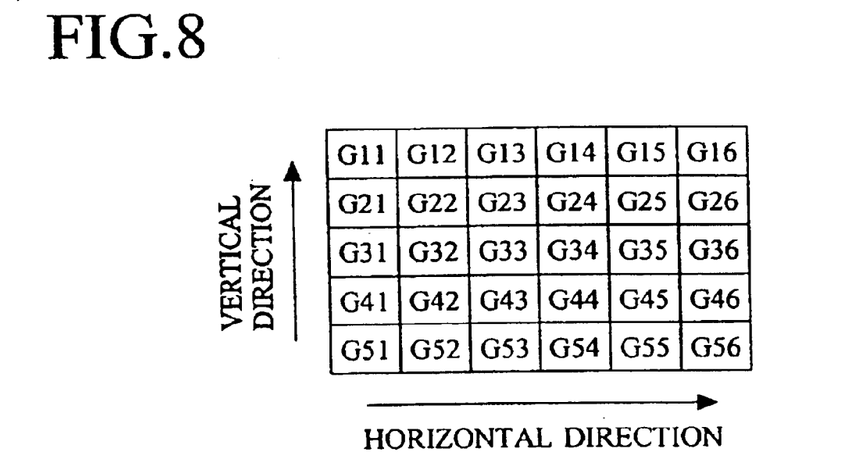
FIG. 8 is a diagram showing the arrangement of pixels.

Now, how this edge enhancer 3 operates will be described, taking up a case in which it processes the image data of an image composed of six (in the horizontal direction)×five (in the vertical direction) pixels as shown in FIG. 8. Reference symbols G11 to G56 represent the individual pixels. On the basis of these image data, an image is reproduced on a display having five rows each including six pixels. First, from the resolution converter 2, the image data of six pixels of one row after another are fed in sequentially via the input terminal IN. In FIG. 8, each rectangle represents one pixel.

Figure 9A:
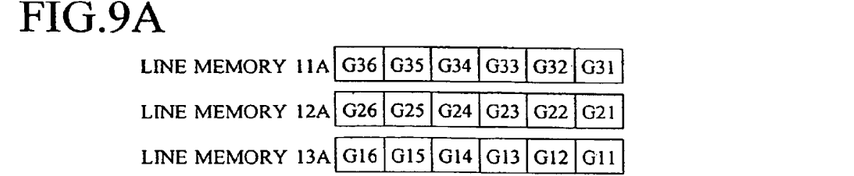
FIGS. 9A to 9F are diagrams illustrating how the data stored in the line memories and delay circuits change.

First, the image data corresponding to three rows are fed in via the input terminal IN, and, as shown in FIG. 9A, the image data of the pixels G11 to G16 of the first row are temporarily stored in the line memory 13A, the image data of the pixels G21 to G26 of the second row in the line memory 12A, and the image data of the pixels G31 to G36 of the third row in the line memory 11A. Here, the image data are fed from the input terminal IN to the line memory 11A, then from the line memory 11A to the line memory 12A, and then from the line memory 12A to the line memory 13A.

In addition, the image data are fed also from the input terminal IN to the line memory 37A, then from the line memory 37A through the SEL 39A to the line memory 40A, and then from the line memory 40A through the SEL 42A to the line memory 43A. As a result, the image data of the pixels G11 to G16 of the first row are temporarily stored in the line memory 43A, the image data of the pixels G21 to G26 of the second row in the line memory 40A, and the image data of the pixels G31 to G36 of the third row in the line memory 37A.

Meanwhile, until the image data of the first row are fed to the line memory 13A, the blocks other than the line memories 11A to 13A, 37A, 40A, and 43A and the SELs 39A and 42A are kept inactive by the controller 4. Here, the SELs 39A and 42A, receiving no signals from the COMP 22A and the OR 46A, respectively, choose and output the outputs of the line memories 37A and 40A, respectively.

When the image data of the first row are stored in the line memory 13A, from the input terminal IN and the line memory 11A, the image data of the pixels G41 and G31, respectively, are fed to SUB 14A; from the line memories 11A and 12A, the image data of the pixels G31 and G21, respectively, are fed to SUB 15A; and, from the line memories 12A and 13A, the image data of the pixels G21 and G11, respectively, are fed to the SUB 16A. Simultaneously, the image data of the pixel G41 are fed from the input terminal IN to the line memory 11A, the image data of the pixel G31 are fed from the line memory 11A to the line memory 12A, and the image data of the pixel G21 are fed from the line memory 12A to the line memory 13A. Note that, in the following descriptions of the operation of the edge enhancer 3, the image data of the pixel Gmn are represented simply as Gmn.

The SUB 14A calculates the difference (G31–G41) by subtracting the image data of the pixel G41 from the image data of the pixel G31, the SUB 15A calculates the difference (G21–G31) by subtracting the image data of the pixel G31 from the image data of the pixel G21, and the SUB 16A calculates the difference (G11–G21) by subtracting the image data of the pixel G21 from the image data of the pixel G11. The outputs of the SUBs 14A, 15A, and 16A are fed respectively to the ABSs 17A, 18A, and 19A, which then calculate the absolute values |G31–G41|, |G21–G31|, and |G11–G21| of the differences fed respectively thereto.

The outputs of the SUBs 14A and 15A are fed to the sign comparing circuit 20A, which compares the signs of the differences (G31–G41) and (G21–G31), and the outputs of the SUBs 15A and 16A are fed to the sign comparing circuit 21A, which compares the signs of the differences (G21–G31) and (G11–G21). The sign comparing circuit 20A outputs a high-level signal when the outputs of the SUBs 14A and 15A have identical signals, and the sign comparing circuit 21A outputs a high-level signal when the outputs of the SUBs 15A and 16A have identical signals.

Then, the outputs of the ABSs 17A and 18A are fed to the COMP 22A, which checks whether |G21–G31|−|G31–G41|>HD or not (here, HD represents the same value as the threshold value HD in the first embodiment). Simultaneously, the outputs of the ABSs 18A and 19A are fed to the COMP 23A, which checks whether |G21−G31|−|G11−G21|>HD or not. The COMP 22A outputs a high-level signal when the difference between the outputs of the ABSs 17A and 18A is greater than the threshold value HD, and the COMP 23A outputs a high-level signal when the difference between the outputs of the ABSs 18A and 19A is greater than the threshold value HD.

The outputs of the sign comparing circuit 20A and the COMP 22A are fed to the AND 24A, and the outputs of the sign comparing circuit 21A and the COMP 23A are fed to the AND 25A. The outputs of the ANDs 24A and 25A are fed respectively to the SELs 26A and 27A. When the ANDs 24A and 25A output a high level, the SELs 26A and 27A, respectively, select "1/HE" (here, HE represents the same value as the threshold value HE in the first embodiment) from the LUTs 28A and 29A.

Specifically, if the differences (G21−G31) and (G31−G41) have identical signs and in addition |G21−G31|−|G31−G41|>HD, then the SEL 26A selects "1/HE" from the LUT 28A. On the other hand, if the differences (G11−G21) and (G21−G31) have identical signs and in addition |G21−G31|−|G11−G21|>HD, then the SEL 27A selects "1/HE" from the LUT 29A. Here, the LUTs 28A and 29A each store two values "0" and "1/HE".

The values selected by the SELs 26A and 27A are fed respectively to the multiplying circuits 30A and 31A, which then multiply by those values the outputs of the SUBs 14A and 16A that are also fed respectively thereto. Specifically, if the values that the SELs 26A and 27A have selected from the LUTs 28A and 29A are k (where k equals "0" or "1/HE"), then the multiplying circuits 30A and 31A outputs k×(G31−G41) and k×(G11−G21), respectively.

The outputs of the multiplying circuits 30A and 31A are fed respectively to the INTs 32A and 33A, which round down the values fed thereto to the nearest integer numbers and output only their integer-number portions. Specifically, if the SEL 26A has selected "1/HE", and the output (G31−G41)/HE of the multiplying circuit 30A has an integer-number portion "α1" and a decimal portion "β1", then only its integer-number portion "α1" is fed from the INT 32A to the subtracting circuit 34A and the adding circuit 36A. On the other hand, if the SEL 26A has selected "0" and the multiplying circuit 30A outputs "0", then the INT 32A feeds "0" to the subtracting circuit 34A and the adding circuit 36A.

If the SEL 27A has selected "1/HE" and the output (G11−G21)/HE of the multiplying circuit 31A has an integer-number portion "α2" and a decimal portion "β2", then only its integer-number portion "α2" is fed from the INT 33A to the subtracting circuit 35A and the adding circuit 36A. On the other hand, if the SEL 27A has selected "0" and the multiplying circuit 31A outputs "0", then the INT 33A feeds "0" to the subtracting circuit 35A and the adding circuit 36A.

Then, the outputs of the subtracting circuit 34A, adding circuit 36A, and subtracting circuit 35A are fed respectively to the adding circuits 38A, 41A, and 44A. Thus, the adding circuit 38A outputs image data obtained by adding the difference newly produced by the subtracting circuit 34A to the image data of the pixel fed in via the input terminal IN. Specifically, if the output of the INT 32A is γ1 (where γ1 equals "0" or "α1"), then the adding circuit 38A receives, from the input terminal IN, the image data of the pixel G41 and, from the subtracting circuit 34A, the value (G31−G41)−γ1. Thus, the adding circuit 38A outputs G31−γ1.

The output G31−γ1 of the adding circuit 38A and the image data of the pixel G31 stored in the line memory 37A are simultaneously fed to the SEL 39A. The SEL 39A selects the output of the adding circuit 38A when the COMP 22A outputs a high level, and selects the output of the line memory 37A when the COMP 22A outputs a low level. The value selected by SEL 39A is fed, as the new image data G31A (where G31A equals G31 or G31−γ1) of the pixel G31, to the line memory 40A.

At this time, if the output of the INT 33A is γ2 (where γ2 equals "0" or "α2"), the adding circuit 41A receives, from the SEL 39A, the new image data G31A of the pixel G31 and, from the adding circuit 36A, the value (G21−G31)+γ1+γ2. Thus, the adding circuit 41A outputs G31A+(G21−G31)+γ1+γ2. Specifically, if the SEL 39A outputs G31, the INT 32A outputs "0", and accordingly the adding circuit 41A outputs G21+γ2. If the SEL 39A outputs G31−γ1, the adding circuit 41A outputs (G31−γ1)+(G21−G31)+γ1+γ2, i.e. G21+γ2.

The output G21+γ2 of the adding circuit 41A and the image data of the pixel G21 stored in the line memory 40A are simultaneously fed to the SEL 42A. The SEL 42A selects the output of the adding circuit 41A when the OR 46A outputs a high level, and selects the output of the line memory 40A when the OR 46A outputs a low level. Specifically, if either of the COMP 22A and the COMP 23A outputs a high level, the SEL 42A selects the output of the adding circuit 41A. The value selected by the SEL 42A is fed, as the new image data G21A (where G21A equals G21 or G21+γ2) of the pixel G21, to the line memory 43A.

At this time, the adding circuit 44A receives, from the SEL 42A, the new image data G21A of the pixel G21 and, from the subtracting circuit 35A, the value (G11+G21)−γ2. Thus, the adding circuit 44A outputs G21A+(G11−G21)−γ2. Specifically, if the SEL 42A outputs G21, the output γ2 of the INT 33A is "0", and accordingly the adding circuit 44A outputs G11. If the SEL 42A outputs G21+γ2, he adding circuit 44A outputs (G21+γ2)+(G11−G21)−γ2, i.e. G11.

The output G11 of the adding circuit 44A and the image data of the pixel G11 stored in the line memory 43A are simultaneously fed to the SEL 45A. The SEL 45A selects the output of the adding circuit 44A when the COMP 23A outputs a high level, and selects the output of the line memory 43A when the COMP 23A outputs a low level. Then, the value selected by the SEL 45A is fed, as the new image data of the pixel G11, to the DELAYs 11B and 37B.

Figure 9B:
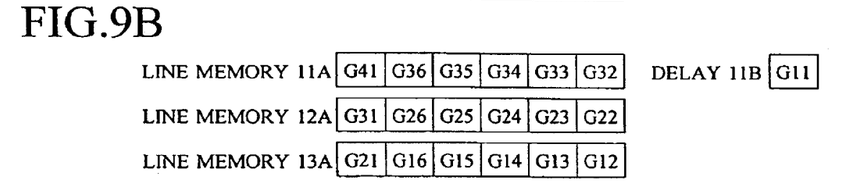

When the SEL 45A outputs the image data of the pixel G11 in this way, the data stored in the line memories 11A, 12A, and 13A and the DELAY 11B are as shown in FIG. 9B. Specifically, the image data of the pixels G32 to G36 and G41 are stored in the line memory 11A, the image data of the pixels G22 to G26 and G31 are stored in the line memory 12A, and the image data of the pixels G12 to G16 and G21 are stored in the line memory 13A, and the image data of the pixel G11 are stored in the DELAY 11B.

Figure 9C:
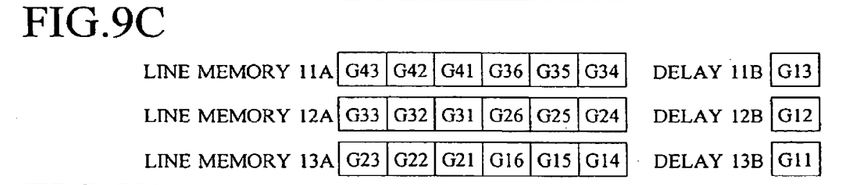

Then, the same operations as described above are performed on the four vertically adjacent pixels G12, G22, G32, and G42, and also on the four vertically adjacent pixels G13, G23, G33, and G43. When the SEL 45A outputs the image data of the pixel G13, the data stored in the line memories 11A, 12A, and 13A and the DELAYs 11B, 12B, and 13B are as shown in FIG. 9C. Specifically, the image data of the pixels G41 to G43 and G34 to G36 are stored in the line memory 11A, the image data of the pixels G31 to G33 and G24 to G26 are stored in the line 20 memory 12A, and the image data of the pixels G21 to G23 and G14 to G16 are stored in the line memory 13A, and the image data of the pixels G13, G12, and G11 are stored respectively in the DELAYs 11B, 12B, and 13B.

At this time, the image data are fed from the SEL 45A to the DELAY 37B, then from the DELAY 37B through the SEL 39B to the DELAY 40B, and then from the DELAY 40B through the SEL 42B to the DELAY 43B. As a result, the image data of the pixel G11 are temporarily stored in the DELAY 43B, the image data of the pixel G12 in the DELAY 40B, and the image data of the pixel G13 in the DELAY 37B.

Meanwhile, until the image data of the pixel G11 are fed to the DELAY 13B, the blocks other than the DELAYs 11B to 13B, 37B, 40B, and 43B and the SELs 39B and 42B are kept inactive by the controller 4. Here, the SELs 39B and 42B, receiving no signals from the COMP 22B and the OR 46B, respectively, choose and output the outputs of the DELAYs 37B and 40B, respectively.

When the above-described operations have been performed on the four vertically adjacent pixels G14, G24, G34, and G44, and the SEL 45A outputs the pixel G14, then, from the SEL 45A and the DELAY 11B, the image data of the pixels G14 and G13, respectively, are fed to SUB 14B; from the DELAYs 11B and 12B, the image data of the pixels G13 and G12, respectively, are fed to SUB 15B; and, from the DELAYs 12B and 13B, the image data of the pixels G12 and G11, respectively, are fed to SUB 16B. Simultaneously, the image data of the pixel G14 are fed from the SEL 45A to the DELAY 11B, the image data of the pixel G13 are fed from the DELAY 11B to the DELAY 12B, and the image data of the pixel G12 are fed from the DELAY 12B to the DELAY 13B. When the image data of the horizontally adjacent pixels G11, G12, G13, and 14 are simultaneously fed to the SUBs 14B, 15B, and 16B in this way, the blocks 14B to 45B perform the same operations as those described above performed by the blocks 14A to 45A. Specifically, the SUBs 14B, 15B, and 16B respectively calculate the differences (G13−G14), (G12−G13), and (G11−G12), and the ABSs 17B, 18B, and 19B respectively calculate the absolute values |G13−G14|, |G12−G13|, and |G11−G12| of those differences.

Then, if the differences (G13−G14) and (G12−G13) have identical signs and in addition |G12−G13|−|G13−G14|>HD, the sign comparing circuit 20B and the COMP 22B each output a high-level signal, and the SEL 26B selects "1/HE" from the LUT 28B. On the other hand, if either of the sign comparing circuit 20B and the COMP 22B outputs a low-level signal, the SEL 26B selects "0" from the LUT 28B. The value k (where k equals "0" or "1/HE") thus selected by the SEL 26B is fed to the multiplying circuit 30B, which then feeds k×(G13−G14) to the INT 32B.

If the differences (G12−G13) and (G11−G12) have identical signs and in addition |G12−G13|−|G11−G12|>HD, the sign comparing circuit 21B and the COMP 23B each output a high-level signal, and the SEL 27B selects "1/HE" from the LUT 29B. On the other hand, if either of the sign comparing circuit 21B and the COMP 23B outputs a low-level signal, the SEL 27B selects "0" from the LUT 29B. The value k (where k equals "0" or "1/HE") thus selected by the SEL 27B is fed to the multiplying circuit 31B, which then feeds k×(G11−G12) to the INT 33B.

If the SEL 26B has selected "1/HE", and the output (G13−G14)/HE of the multiplying circuit 30B has an integer-number portion "δ1" and a decimal portion "ε1", then only its integer-number portion "δ1" is fed from the INT 32B to the subtracting circuit 34B and the adding circuit 36B. On the other hand, if the SEL 26B has selected "0" and the multiplying circuit 30B outputs "0", then the INT 32B feeds "0" to the subtracting circuit 34B and the adding circuit 36B.

If the SEL 27B has selected "1/HE" and the output (G11−G12)/HE of the multiplying circuit 31B has an integer-number portion "δ2" and a decimal portion "ε2", then only its integer-number portion "δ2" is fed from the INT 33B to the subtracting circuit 35B and the adding circuit 36B. On the other hand, if the SEL 27B has selected "0" and the multiplying circuit 31B outputs "0", then the INT 33B feeds "0" to the subtracting circuit 35B and the adding circuit 36B.

Then, the outputs of the subtracting circuit 34B, adding circuit 36B, and subtracting circuit 35B are fed respectively to the adding circuits 38B, 41B, and 44B. Thus, if the output of the INT 32B is $\zeta 1$ (where $\zeta 1$ equals "0" or "δ1"), the adding circuit 38B outputs image data G13−$\zeta 1$ obtained by adding the difference (G13−G14)−$\zeta 1$ newly produced by the subtracting circuit 34B to the image data G14 output from the SEL 45A.

The output G13−$\zeta 1$ of the adding circuit 38B and the image data of the pixel G13 stored in the DELAY 37B are simultaneously fed to the SEL 39B. The SEL 39B selects the output of the adding circuit 38B when the COMP 22B outputs a high level, and selects the output of the DELAY 37B when the COMP 22B outputs a low level. The value selected by SEL 39B is fed, as the new image data G13A (where G13A equals G13 or G13−$\zeta 1$) of the pixel G13, to the DELAY 40B.

At this time, if the output of the INT 33B is $\zeta 2$ (where $\zeta 2$ equals "0" or "δ2"), the adding circuit 41B receives, from the SEL 39B, the new image data G13A of the pixel G13 and, from the adding circuit 36B, the value (G12−G13)+$\zeta 1$+$\zeta 2$. Thus, the adding circuit 41B outputs G13A+(G12−G13)+$\zeta 1$+$\zeta 2$. Specifically, if the SEL 39B outputs G13, the INT 32B outputs "0", and accordingly the adding circuit 41B outputs G12+$\zeta 2$. If the SEL 39B outputs G13−$\zeta 1$, the adding circuit 41B outputs (G13−$\zeta 1$)+(G12−G13)+$\zeta 1$+$\zeta 2$, i.e. G12+$\zeta 2$.

The output G12+$\zeta 2$ of the adding circuit 41B and the image data of the pixel G12 stored in the line memory 40B are simultaneously fed to the SEL 42B. The SEL 42B selects the output of the adding circuit 41B when the OR 46B outputs a high level, and selects the output of the DELAY 40B when the OR 46B outputs a low level. Specifically, if either of the COMP 22B and the COMP 23B outputs a high level, the SEL 42B selects the output of the adding circuit 41B. The value selected by the SEL 42B is fed, as the new image data G12A (where G12A equals G12 or G12+$\zeta 2$) of the pixel G12, to the DELAY 43B.

At this time, the adding circuit 44B receives, from the SEL 42B, the new image data G12A of the pixel G12 and, from the subtracting circuit 35B, the value (G11+G12)−$\zeta 2$. Thus, the adding circuit 44B outputs G12A+(G11−G12)−$\zeta 2$. Specifically, if the SEL 42B outputs G12, the output $\zeta 2$ of the INT 33B is "0", and accordingly the adding circuit 44B outputs G11. If the SEL 42B outputs G12+$\zeta 2$, the adding circuit 44B outputs (G12+$\zeta 2$)+(G11−G12)−$\zeta 2$, i.e. G11.

The output G11 of the adding circuit 44B and the image data of the pixel G11 stored in the DELAY 43B are simultaneously fed to the SEL 45B. The SEL 45B selects the output of the adding circuit 44B when the COMP 23B outputs a high level, and selects the output of the DELAY 43B when the COMP 23B outputs a low level. Then, the value selected by the SEL 45B is fed, as the new image data of the pixel G11, to the controller 4 via an output terminal OUT.

Figure 9D:
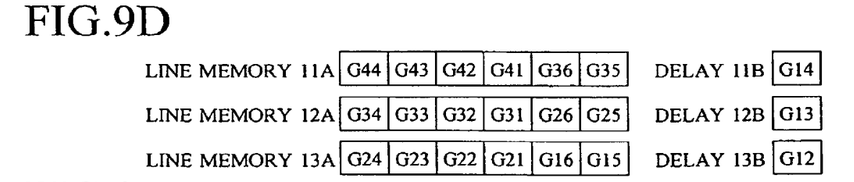

When the image data of the pixel G11 are output via the output terminal OUT, the data stored in the line memories 11A, 12A, and 13A and the DELAYs 11B, 12B, and 13B are as shown in FIG. 9D. Specifically, the image data of the pixels G41 to G44, G35, and G36 are stored in the line memory 11A, the image data of the pixels G31 to G34, G25, and G26 are stored in the line memory 12A, and the image data of the pixels G21 to G24, G15, and G16 are stored in the line memory 13A, and the image data of the pixels G14, G13, and G12 are stored in the DELAYs 11B, 12B, and 13B.

Figure 9E:
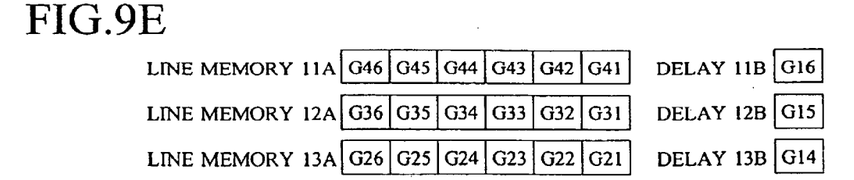

By repeating the operations described above, the data stored in the line memories 11A, 12A, and 13A and the DELAYs 11B, 12B, and 13B are as shown in FIG. 9E. Specifically, the image data of the pixel G13 are output via the output terminal OUT, and the image data of the pixel G21 are output from the SEL 45A. At this time, the pixel G21 is a pixel located in a different row from the pixels G14 to G16, and thus is not horizontally adjacent thereto.

Figure 9F:
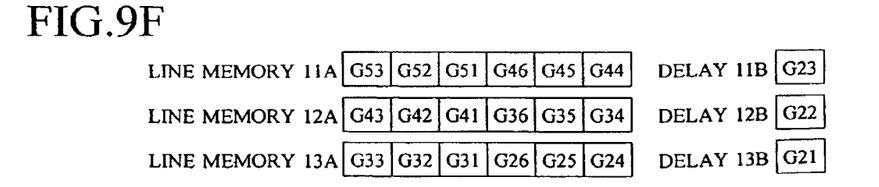

Accordingly, the controller 4 halts the operation of the blocks 14B to 36B, and thus the horizontal direction processor 3B does not perform the operations described above. These blocks 14B and 36B restart their operation when, as shown in FIG. 9F, the image data of the pixel G21 are stored in the DELAY 13B and the image data of the pixel G24 are output from the SEL 45A. Thereafter, the operations described above are repeated to process the image data of the pixels G11 to G56, and thereby the image data of the individual pixels shown in FIG. 8 are converted into image data subjected to edge enhancement.

Although omitted in this embodiment, in FIG. 7, delay circuits may be provided on the way from the input terminal IN to the line memory 37A and the adding circuit 38A and on the way from the SEL 45A to the DELAY 37B and the adding circuit 38B. This makes it possible to input data simultaneously to the SELs 39A and 39B.

Third Embodiment

A third embodiment of the present invention will be described with reference to the drawings. The image processing apparatus of this embodiment has the same overall configuration as that of the first embodiment shown in FIG. 1, and differs therefrom only in the operation of the edge enhancer. Accordingly, only the internal configuration and operation of the edge enhancer will be described below.

Figure 10:
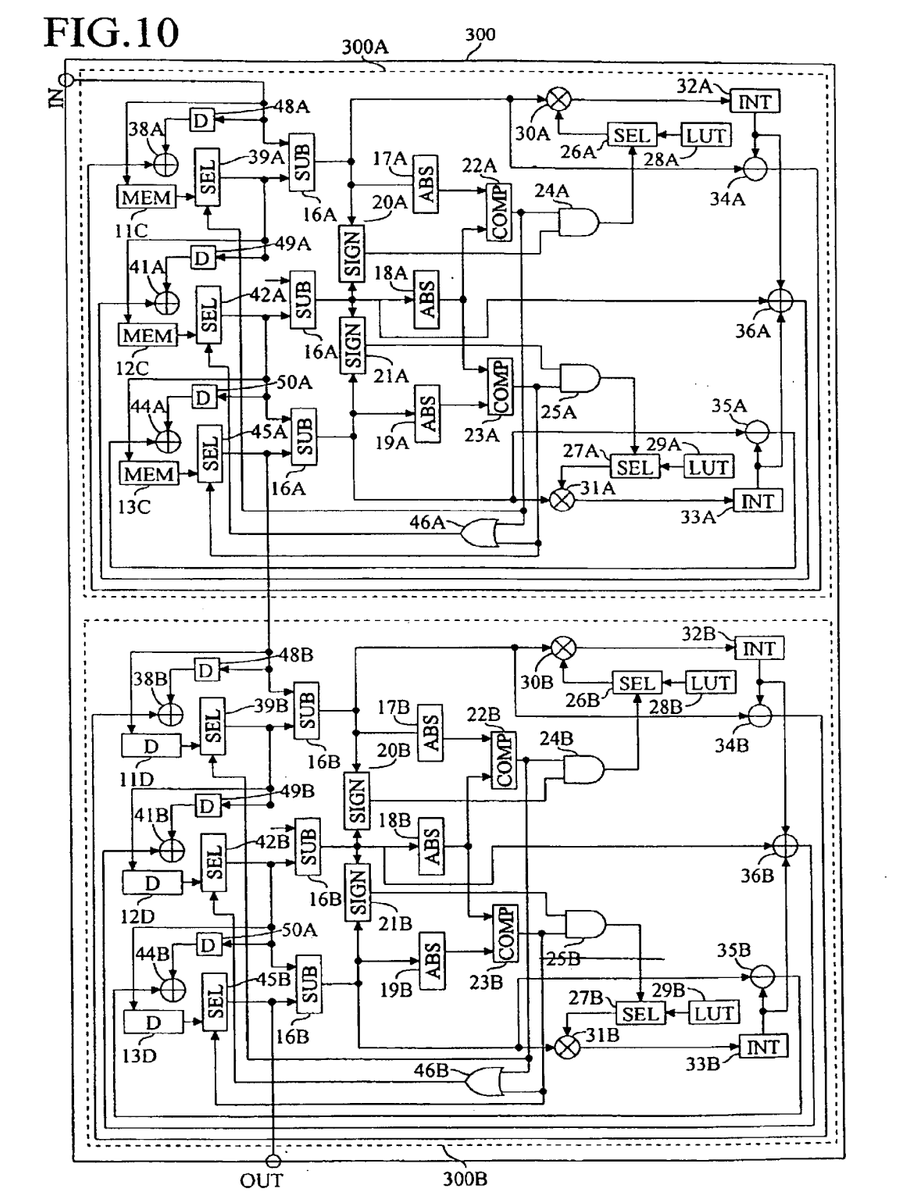
FIG. 10 is a block diagram showing the internal configuration of the edge enhancer shown in FIG. 1.

FIG. 10 shows the internal configuration of the edge enhancer 300. In the edge enhancer 300 shown in FIG. 10, such blocks as are used for the same purposes as in the edge enhancer 3 of the second embodiment shown in FIG. 7 are identified with the same reference numerals, and their detailed descriptions will not be repeated.

In the edge enhancer 300 shown in FIG. 10, the vertical direction processor 300A has line memories 11C, 12C, and 13C that respectively function both as the line memories 11A, 12A, and 13A and as the line memories 37A, 40A, and 43A shown in FIG. 7, and the horizontal direction processor 300B has DELAYs 11D, 12D, and 13D that respectively function both as the DELAYs 11B, 12B, and 13B and as the DELAYs 37B, 40B, and 43B shown in FIG. 7. The SUB 14A receives the image data fed in via the input terminal IN and the output of the SEL 39A, the SUB 15A receives the outputs of the SELs 39A and 42A, and the SUB 16A receives the outputs of the SUBs 42A and 45A.

The SUB 14B receives the outputs of the SELs 45A and 39B, the SUB 15B receives the outputs of the SELs 39B and 42B, and the SUB 16B receives the outputs of the SELs 42B and 45B. The adding circuits 38A, 41A and 44A receive image data respectively through the DELAYs 48A, 49A, and 50A from the input terminal IN and the SELs 39A and 42A. The adding circuits 38B, 41B, and 44B receive image data respectively through the DELAYs 48B, 49B, and 50B from the SELs 45A, 39B, and 42B.

In this edge enhancer 300 configured as described above, the blocks 14A to 36A and 46A and the blocks 14B to 36B and 46B operate in the same manner as the blocks 14A to 36A and 46A and the blocks 14B to 36B and 46B of the edge enhancer 3 of the second embodiment. Therefore, the operation of these blocks, already described in connection with the second embodiment, will not be repeated.

Now, descriptions will be given of the operation of the line memories 11C, 12C, and 13C, SELs 39A, 42A, and 45A, adding circuits 38A, 41A, 44A, and DELAYs 48A, 49A, and 50A provided in the vertical direction processor 300A and the DELAYs 11D, 12D, and 13D, SELs 39B, 42B, and 45B, adding circuits 38B, 41B, and 44B, and DELAYs 48B, 49B, and 50B provided in the horizontal direction processor 300B.

As in the second embodiment, when the image data of pixels arranged as shown in FIG. 8 are received, until the image data of the pixel G41 is fed in via the input terminal IN, the SELs 39A, 42A, and 45A select the image data stored in the line memories 11G, 12C, and 13C, respectively. When the image data of the pixel G41 is fed in, the SELs 39A, 42A, and 45A output the image data of the pixels G11, G21, and G31, respectively. Then, the image data are processed by the individual blocks 14A to 36A so that the differences newly produced by the subtracting circuit 34A, adding circuit 36A, and subtracting circuit 35A are fed respectively to the adding circuits 38A, 41A, and 44A.

At this time, from the DELAYs 48A, 49A, and 50A, the image data of the pixels G41, G31, and G21 are fed respectively to the adding circuits 38A, 41A, and 44A. These DELAYs 48A, 49A, and 50A are provided to feed the image data to the adding circuits 38A, 41A, and 44A at the same time that the differences newly produced by the subtracting circuit 34A, adding circuit 36A, and subtracting circuit 35A obtained as a result of the individual blocks 14A to 36A processing the image data are fed thereto.

Then, the outputs of the adding circuit 38A and the line memory 11C are fed to the SEL 39A, the outputs of the adding circuit 41A and the line memory 12C are fed to the SEL 42A, and the outputs of the adding circuit 44A and the line memory 13C are fed to the SEL 45A. As in the second embodiment, the SELs 39A, 42A, and 45A choose between and output one of the two sets of image data fed thereto in accordance with the outputs of the COMPs 22A and 23A. At this time, the output of the SEL 39A is fed to the SUBs 14A and 15A, the DELAY 49A, and the line memory 12C, the output of the SEL 42A is fed to the SUBs 15A and 16A, the DELAY 50A, and the line memory 13C, and the output of the SEL 45A is fed to the SUB 16A, the DELAY 48B, and the DELAY 11D.

The DELAYs 11D, 12D, and 13D, SELs 39B, 42B, and 45B, adding circuits 38B, 41B, 44B, and DELAYs 48B, 49B, and 50B provided in the horizontal direction processor 300B perform similar operations to those performed by the line memories 11C, 12C, and 13C, SELs 39A, 42A, and 45A, adding circuits 38A, 41A, 44A, and DELAYs 48A, 49A, and 50A provided in the vertical direction processor 300A. As a result, the image data having subjected to edge enhancement are sequentially output via the output terminal OUT.

In this way, in this embodiment, by using common line memories that function both as line memories for feeding data to SUBs and line memories for feeding data to SELs, which are provided separately in the second embodiment, and by using common DELAYs that function both as DELAYs for feeding data to SUBs and DELAYs for feeding data to SELs, which are provided separately in the second embodiment, it is possible to simplify the configuration of an image processing apparatus.

The first to third embodiments described above all deal with an image processing apparatus that employs a resolution converter. However, the edge enhancers described above are applicable also to image processing apparatuses that reproduce images by performing edge enhancement on image data output from an interpolation circuit that performs interpolation of images shot by interlaced scanning. Moreover, the edge enhancers described above are applicable even to image processing apparatuses that reproduce images by performing edge enhancement on image data that do not require interpolation.

As described above, according to the present invention, when the image data of adjacent pixels are changed by changing the difference between the image data of those pixels, the differences of adjacent pixels located nearby are also considered. This makes it possible to perform edge enhancement in such a way as to yield images with satisfactory gradation and without unduly steep intensity gradients in edge portions relative to portions surrounding them as compared with the original images, and thus with reduced graininess in the processed images. Moreover, on the basis of the thus obtained image data with satisfactory gradation, it is possible to reproduce high-resolution images with satisfactory perspective.

What is claimed is:

1. An image processing apparatus comprising:
   a difference calculator that calculates, for each detection-target unit including a predetermined number of pixels, differences between values of every two adjacent pixels within the detection-target unit; and
   a pixel value determiner that changes the values of two pixels located at a center of the detection-target unit in such a way as to increase the difference between the values of those two pixels when the difference between the values of those two pixels has a greatest absolute value within the detection-target unit and all the differences between the values of every two adjacent pixels within the detection-target unit have identical signs,
   wherein the pixel value determiner, by changing the values of the pixels, achieves edge enhancement.

2. An image processing apparatus as claimed in claim 1, wherein each detection target unit includes four pixels that are located adjacent to one another in one line.

3. An image processing apparatus comprising:
   a difference calculator that calculates, for each detection-target unit including a predetermined number of pixels, differences between values of every two adjacent pixels within the detection-target unit; and
   a pixel value determiner that changes the values of two pixels located at a center of the detection-target unit in such a way as to increase the difference between the values of those two pixels when the difference between the values of those two pixels has a greatest absolute value within the detection-target unit and all the differences between the values of every two adjacent pixels within the detection-target unit have identical signs,
   wherein the pixel value determiner changes the values of the two pixels located at the center of the detection-target unit in such a way as to increase the difference between the values of those two pixels when the difference between the values of those two pixels has the greatest absolute value within the detection-target unit, and all the differences between the values of every two adjacent pixels within the detection-target unit have identical signs, and in addition a difference between the absolute value of the difference between the values of the two pixels located at the center and absolute values of the differences between the values of the other pixels is greater than a threshold value having a predetermined value.

4. An image processing apparatus as claimed in claim 3, wherein each detection-target unit includes four pixels.

5. An image processing apparatus comprising:
   a difference calculator that calculates, for each detection-target unit including a predetermined number of pixels, differences between values of every two adjacent pixels within the detection-target unit; and
   a pixel value determiner that changes the values of two pixels located at a center of the detection-target unit in such a way as to increase the difference between the values of those two pixels when the difference between the values of those two pixels has a greatest absolute value within the detection-target unit and all the differences between the values of every two adjacent pixels within the detection-target unit have identical signs,
   wherein each detection-target unit includes a first pixel, a second pixel, a third pixel, and a fourth pixel,
   wherein the difference calculator calculates an absolute value of a difference between values of the first and second pixels, an absolute value of a difference between values of the second and third pixels, and an absolute value of a difference between values of the third and fourth pixels,
   wherein, when the absolute value of the difference between the values of the second and third pixels is greater than both of the absolute value of the difference between the values of the first and second pixels and the absolute value of the difference between the values of the third and fourth pixels,
   if the difference between the values of the first and second pixels and the difference between the values of the second and third pixels have identical signs and a difference between absolute values of these two differences is greater than a threshold value, the pixel value determiner determines the values of the second and third pixels by reducing the difference between the values of the first and second pixels and by increasing the difference between the values of the second and third pixels, and
   if the difference between the values of the third and fourth pixels and the difference between the values of the second and third pixels have identical signs and a difference between absolute values of these two differences is greater than a threshold value, the pixel value determiner determines the values of the second and third pixels by reducing the difference between the values of the third and fourth pixels and by increasing the difference between the values of the second and third pixels.

6. An image processing apparatus comprising:
   a difference calculator that calculates, for each detection-target unit including a predetermined number of pixels, differences between values of every two adjacent pixels within the detection-target unit; and
   a pixel value determiner that changes the values of two pixels located at a center of the detection-target unit in such a way as to increase the difference between the values of those two pixels when the difference between the values of those two pixels has a greatest absolute value within the detection-target unit and all the differences between the values of every two adjacent pixels within the detection-target unit have identical signs, wherein each detection-target unit includes a first pixel, a second pixel, a third pixel, and a fourth pixel, wherein the difference calculator calculates an absolute value of a difference between values of the first and second pixels, an absolute value of a difference between values of the second and third pixels, and an absolute value of a difference between values of the third and fourth pixels, wherein, when the absolute value of the difference between the values of the second and third pixels is greater than both of the absolute value of the difference between the values of the first and second pixels and the absolute value of the difference between the values of the third and fourth pixels,

- if the difference between the values of the first and second pixels and the difference between the values of the second and third pixels have identical signs and a difference between absolute values of these two differences is greater than a threshold value, the pixel value determiner calculates a quotient obtained by dividing the difference between the values of the first and second pixels by a predetermined value and determines the values of the second and third pixels by reducing the difference between the values of the first and second pixels by subtracting the quotient therefrom and by increasing the difference between the values of the second and third pixels by adding the quotient thereto, and

- if the difference between the values of the third and fourth pixels and the difference between the values of the second and third pixels have identical signs and a difference between absolute values of these two differences is greater than a threshold value, the pixel value determiner calculates a quotient obtained by dividing the difference between the values of the third and fourth pixels by a predetermined value and determines the values of the second and third pixels by reducing the difference between the values of the third and fourth pixels by subtracting the quotient therefrom and by increasing the difference between the values of the second and third pixels by adding the quotient thereto.

7. An image processing apparatus comprising:

a first difference calculator for calculating a difference between a value of a first pixel and a value of a second pixel that is adjacent to the first pixel;

a second difference calculator for calculating a difference between the value of the second pixel and a value of a third pixel that is adjacent to the second pixel;

a third difference calculator for calculating a difference between the value of the third pixel and a value of a fourth pixel that is adjacent to the third pixel;

a first comparator for comparing a difference between absolute values of the differences calculated by the first and second difference calculators with a threshold value;

a second comparator for comparing a difference between absolute values of the differences calculated by the second and third difference calculators with the threshold value;

a first divider for calculating a quotient obtained by dividing the difference calculated by the first difference calculator by a predetermined value when the absolute value of the difference calculated by the second difference calculator is greater than the absolute value of the difference calculated by the first difference calculator and the difference between the absolute values of the differences calculated by the first and second difference calculators is greater than the threshold value;

a second divider for calculating a quotient obtained by dividing the difference calculated by the third difference calculator by a predetermined value when the absolute value of the difference calculated by the second difference calculator is greater than the absolute value of the difference calculated by the third difference calculator and the difference between the absolute values of the differences calculated by the second and third difference calculators is greater than the threshold value;

a first adder for adding the quotients calculated by the first and second dividers to the difference calculated by the second difference calculator;

a first subtracter for subtracting the quotient calculated by the first divider from the difference calculated by the first difference calculator;

a second subtracter for subtracting the quotient calculated by the second divider from the difference calculated by the third difference calculator;

a second adder for adding an output of the first subtracter to the value of the first pixel to obtain a value with which to replace the value of the second pixel;

a first converter that receives the value of the second pixel and the output of the second adder and that, when the first divider operates, replaces the value of the second pixel with the value output from the second adder;

a third adder for adding the output of the first adder to the value of the second pixel as output from the first converter;

a second converter that receives the value of the third pixel and the output of the third adder and that, when one of the first and second dividers operates, replaces the value of the third pixel with the value output from the third adder;

a fourth adder for adding an output of the second subtracter to the value of the third pixel as output from the second converter to obtain a value with which to replace the value of the fourth pixel; and a third converter that receives the value of the fourth pixel and the output of the fourth adder and that, when the second divider operates, replaces the value of the fourth pixel with the value output from the fourth adder.

8. An image processing apparatus as claimed in claim 7, wherein processing of values of pixels is performed in a plurality of directions so that pixels adjacent in one direction after another are processed.

9. An image processing apparatus as claimed in claim 7, further comprising:

a first memory for temporarily storing the value of the second pixel in order to feed the values of the first and second pixels simultaneously to the first difference calculator;

a second memory for temporarily storing the value of the third pixel in order to feed the values of the second and third pixels simultaneously to the second difference calculator;

a third memory for temporarily storing the value of the fourth pixel in order to feed the values of the third and fourth pixels simultaneously to the third difference calculator;

a fourth memory for temporarily storing the value of the second pixel in order to feed the output of the second adder and the value of the second pixel simultaneously to the first converter;

a fifth memory for temporarily storing the value of the third pixel in order to feed the output of the third adder and the value of the third pixel simultaneously to the second converter; and a sixth memory for temporarily storing the value of the fourth pixel in order to feed the output of the fourth adder and the value of the fourth pixel simultaneously to the third converter.

10. An image processing apparatus as claimed in claim 9, wherein processing of values of pixels is performed in a plurality of directions so that pixels adjacent in one direction after another are processed.

11. An image processing apparatus as claimed in claim 9, wherein the first and fourth memories are built as a single memory, the second and fifth memories are built as a single memory, and the third and sixth memories are built as a single memory.

12. An image processing apparatus as claimed in claim 11, wherein processing of values of pixels is performed in a plurality of directions so that pixels adjacent in one direction after another are processed.

* * * * *